United States Patent
Guenther et al.

(10) Patent No.: US 11,897,228 B2
(45) Date of Patent: Feb. 13, 2024

(54) CLADDED ARTICLE WITH CLAD LAYER HAVING VARYING THICKNESS

(71) Applicant: DMC Global Inc., Broomfield, CO (US)

(72) Inventors: Karsten Guenther, Osnabrück (DE); Curtis Erwin Prothe, Brevard, NC (US); Steven David Sparkowich, Vancouver, WA (US); Andrew Ruminski, Natrona Heights, PA (US)

(73) Assignee: DMC Global Inc., Broomfield, CO (US)

( * ) Notice: Subject to any disclaimer, the term of this patent is extended or adjusted under 35 U.S.C. 154(b) by 220 days.

(21) Appl. No.: 17/480,072

(22) Filed: Sep. 20, 2021

(65) Prior Publication Data

US 2022/0001649 A1 Jan. 6, 2022

Related U.S. Application Data

(63) Continuation-in-part of application No. PCT/US2020/024264, filed on Mar. 23, 2020.

(60) Provisional application No. 62/822,223, filed on Mar. 22, 2019.

(51) Int. Cl.
| | |
|---|---|
| *B32B 15/01* | (2006.01) |
| *B23K 20/08* | (2006.01) |
| *B23K 20/10* | (2006.01) |
| *B23K 103/08* | (2006.01) |

(52) U.S. Cl.
CPC ............. *B32B 15/01* (2013.01); *B23K 20/08* (2013.01); *B23K 20/10* (2013.01); *B23K 2103/08* (2018.08)

(58) Field of Classification Search
CPC ...................................................... B32B 15/01
See application file for complete search history.

(56) References Cited

U.S. PATENT DOCUMENTS

| | | | |
|---|---|---|---|
| 3,630,694 | A | 12/1971 | Enright et al. |
| 4,133,471 | A | 1/1979 | Niwatukino |
| 6,283,357 | B1 | 9/2001 | Kulkarni et al. |
| 6,355,362 | B1 | 3/2002 | Jones et al. |
| 6,602,545 | B1 | 8/2003 | Shaikh et al. |

(Continued)

FOREIGN PATENT DOCUMENTS

| | | |
|---|---|---|
| CA | 2938329 C | 2/2017 |
| CA | 2914983 C | 4/2018 |

(Continued)

OTHER PUBLICATIONS

English translation of JPS60135248A, obtained form USPTO FIT database on Sep. 27, 2023 (Year: 2023).*

(Continued)

*Primary Examiner* — Adam Krupicka
(74) *Attorney, Agent, or Firm* — Womble Bond Dickinson (US) LLP

(57) ABSTRACT

A cladded article may include a first metallic layer, a clad layer, and a first solid-state welding interface region positioned between the clad layer and the first metallic layer. The clad layer may include a first clad layer region having a first clad layer thickness in a thickness direction of the clad layer and a second clad layer region having a second clad layer thickness in the thickness direction of the clad layer. The second clad layer thickness may be greater than the first clad layer thickness.

16 Claims, 15 Drawing Sheets

(56) References Cited

U.S. PATENT DOCUMENTS

| | | |
|---|---|---|
| 8,097,336 B2 | 1/2012 | Owens |
| 8,375,581 B2 | 2/2013 | Romanelli et al. |
| 8,733,422 B2 | 5/2014 | Browning et al. |
| 8,834,168 B2 | 9/2014 | Peters et al. |
| 9,095,932 B2 | 8/2015 | Miller et al. |
| 9,101,979 B2 | 8/2015 | Hofmann et al. |
| 9,192,056 B2 | 11/2015 | Rubenchik et al. |
| 9,272,365 B2 | 3/2016 | Bruck et al. |
| 9,279,328 B2 | 3/2016 | Roy et al. |
| 9,303,300 B2 | 4/2016 | Dishi |
| 9,346,116 B2 | 5/2016 | Guldberg |
| 9,481,931 B2 | 11/2016 | Stempfer |
| 9,511,446 B2 | 12/2016 | Kandasamy et al. |
| 9,627,676 B2 | 4/2017 | Oda et al. |
| 9,755,463 B2 | 9/2017 | Klassen et al. |
| 9,784,111 B2 | 10/2017 | Luo et al. |
| 9,789,664 B2 | 10/2017 | Cook, III et al. |
| 9,806,500 B2 | 10/2017 | Sakairi et al. |
| 10,046,413 B2 | 8/2018 | Bruck |
| 10,046,416 B2 | 8/2018 | Bruck et al. |
| 10,065,271 B2 | 9/2018 | Mrotzek et al. |
| 10,124,410 B2 | 11/2018 | Kanko et al. |
| 2008/0277452 A1 | 11/2008 | Castelijns et al. |
| 2014/0218850 A1 | 8/2014 | Prest et al. |

FOREIGN PATENT DOCUMENTS

| | | |
|---|---|---|
| CN | 102573372 A | 7/2012 |
| CN | 103492096 B | 1/2014 |
| CN | 104439240 A | 3/2015 |
| CN | 105598449 B | 5/2016 |
| CN | 105798301 B | 7/2016 |
| CN | 106180710 B | 12/2016 |
| CN | 104404508 B | 4/2017 |
| EP | 2790858 B1 | 2/2017 |
| GB | 1117130 A | 6/1968 |
| JP | S41-014410 B | 12/1941 |
| JP | 2001098367 A | 4/2001 |
| JP | 5723669 B2 | 5/2015 |
| JP | 5863652 B2 | 2/2016 |
| JP | 6096787 B2 | 3/2017 |
| JP | 6170238 B1 | 7/2017 |
| JP | 6460160 B2 | 1/2019 |
| JP | 2022525559 A | 5/2022 |
| KR | 101674883 B1 | 11/2016 |
| NL | 2017180 B1 | 1/2018 |
| SE | 539763 C2 | 11/2017 |
| SE | 540108 C2 | 3/2018 |
| WO | 2020198153 A1 | 10/2020 |

OTHER PUBLICATIONS

Canadian Intellectual Property Office; Office Action for CA Application No. 3133822, dated Dec. 6, 2022; 4 pages.
Intellectual Property India; First Examination Report for IN Application No. 202117044594, dated Oct. 21, 2022; 5 pages.
Japan Patent Office; Office Action for JP Application No. 2022-501108, dated Sep. 20, 2022; 8 pages.
The State Intellectual Property Office of P.R. China; Office Action for CN Application No. 202080022917.5, dated Aug. 1, 2022; 11 pages.
European Patent Office; Rule 161 Communication for EP Application No. 20724246.2, dated Nov. 8, 2021; 3 pages.
Frazier, Metal Additive Manufacturing: A Review, Journal of Materials Engineering and Performance, vol. 23(6) Jun. 2014—1917, Feb. 24, 2014, 12 pgs.
International Searching Authority, International Search Report and Written Opinion of International App. PCT/US2020/024264, dated Aug. 5, 2020, 13 pgs.
Office Action issued in Chinese Application No. 202080022917.5 dated Mar. 29, 2023, 11 pages.
Office Action issued in Indian Application No. 202117044594 dated Oct. 21, 2022, 5 pages.
Decision of Refusal issued in Japanese Application No. 2022-501108 dated Apr. 18, 2023, 5 pages.
Notice of Non-Final Rejection issued in Korean Application No. 10-2021-7034256 dated Jun. 9, 2023, 6 pages.

* cited by examiner

CLADDED ARTICLE WITH CLAD LAYER HAVING VARYING THICKNESS

CROSS-REFERENCE TO RELATED APPLICATIONS

This application is a continuation-in-part of International Application No. PCT/US2020/024264 filed Mar. 23, 2020, which claims the benefit of U.S. Provisional Patent Application No. 62/822,223, filed Mar. 22, 2019, the entire contents of each of which are incorporated herein by reference.

BACKGROUND

In certain applications, it may be beneficial to combine materials when making an article in order to benefit from the advantageous properties of both materials. For example, steel and aluminum may be combined in manufacturing to make a part that has the strength of steel as well as the reduced weight of aluminum. Other examples may include cookware, which may use an aluminum core for heat spreading and a stainless steel finish for maintaining an attractive aesthetic look, or pressure vessels, which may require a strong material to maintain high pressures while having an interior surface that is resistant to corrosion.

Due to differing properties of metals, it may be difficult to bond dissimilar metals using traditional welding methods. Instead, dissimilar metals may be bonded through cladding. However, known methods of cladding may require that a clad layer be of a substantially uniform thickness in order to achieve a bond of sufficient strength and quality. Nevertheless, in certain applications, it may be desirable to have selective portions of the clad layer be thicker than the remainder of the clad layer, for example, to facilitate bonding or coupling between articles, or to increase corrosion, friction, or heat resistance of a specific area of the article.

Accordingly, it may be desirable to develop a cladded article and method for making a cladded article in which the clad layer may have a varying thickness.

BRIEF DESCRIPTION

An exemplary embodiment of a cladded article may include a first metallic layer, a clad layer, and a first solid-state welding interface region positioned between the clad layer and the first metallic layer. The clad layer may include a first clad layer region having a first clad layer thickness in a thickness direction of the clad layer and a second clad layer region having a second clad layer thickness in the thickness direction of the clad layer. The second clad layer thickness may be greater than the first clad layer thickness.

An exemplary embodiment of a method of manufacturing a cladded article may include providing a first metallic layer comprising a first material and having a first metallic layer surface, providing a clad layer comprising a second material and having a substantially uniform first clad layer thickness, solid-state welding the clad layer to the first metallic layer surface, and, after solid-state welding the clad layer to the first metallic layer surface, creating a modified clad layer region by bonding material to an outer surface of the clad layer opposite the first metallic layer. The second clad layer thickness in the modified clad layer region may be larger than the first clad layer thickness.

A cladded article may include a base layer, a clad layer formed from a material comprising tantalum or a tantalum alloy, a first solid-state welding interface region positioned between the clad layer and the base layer, and a clad layer projection bonded to an underlying portion of the clad layer. The clad layer projection may include a plurality of layered foils solid-state welded to the clad layer. A foil of the plurality of foils may be formed of the material comprising tantalum or the tantalum alloy.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1:
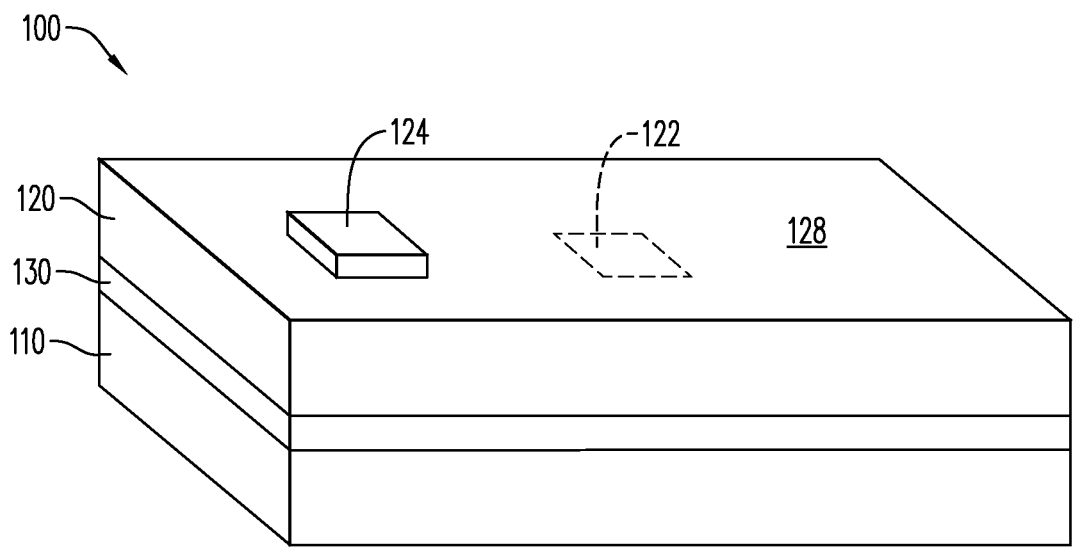
FIG. 1 is a perspective view of a cladded article, according to an exemplary embodiment.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

FIG. 1 shows an exemplary embodiment of a cladded article 100. The cladded article 100 may include a first metallic layer 110 and a clad layer 120. In an exemplary embodiment, the first metallic layer 110 may be formed of a material such as stainless steel, carbon steel, titanium, nickel, aluminum, or alloys including any of these materials. In an exemplary embodiment, the clad layer 120 may be formed of materials such as aluminum, steel, titanium, zirconium, copper, silver, tantalum, or alloys including any of these materials. In another exemplary embodiment, the clad layer 120 may comprise one of niobium, palladium, platinum, ruthenium, rhodium, osmium, and iridium, or an alloy including one of niobium, palladium, platinum, ruthenium, rhodium, osmium, and iridium. However, it will be understood that the first metallic layer 110 and the clad layer 120 are not limited to these materials, and other materials may be used depending on the requirements of the specific application.

The clad layer 120 may be bonded to the first metallic layer 110 through a solid-state welding method, thereby forming a first solid-state welding interface region 130 positioned between the clad layer 120 and the first metallic layer 110. The first solid-state welding interface region 130 may be a region between the clad layer 120 and the first metallic layer 110 where atoms from each of the clad layer 120 and the first metallic layer 110 are diffused among each other. It will be understood that the illustration of the first solid-state welding interface region 130 is for illustration purposes only and is not drawn to scale. In an exemplary embodiment, the first solid-state welding interface region 130 may be a first explosion welding interface region, as described in detail below.

Figure 2:
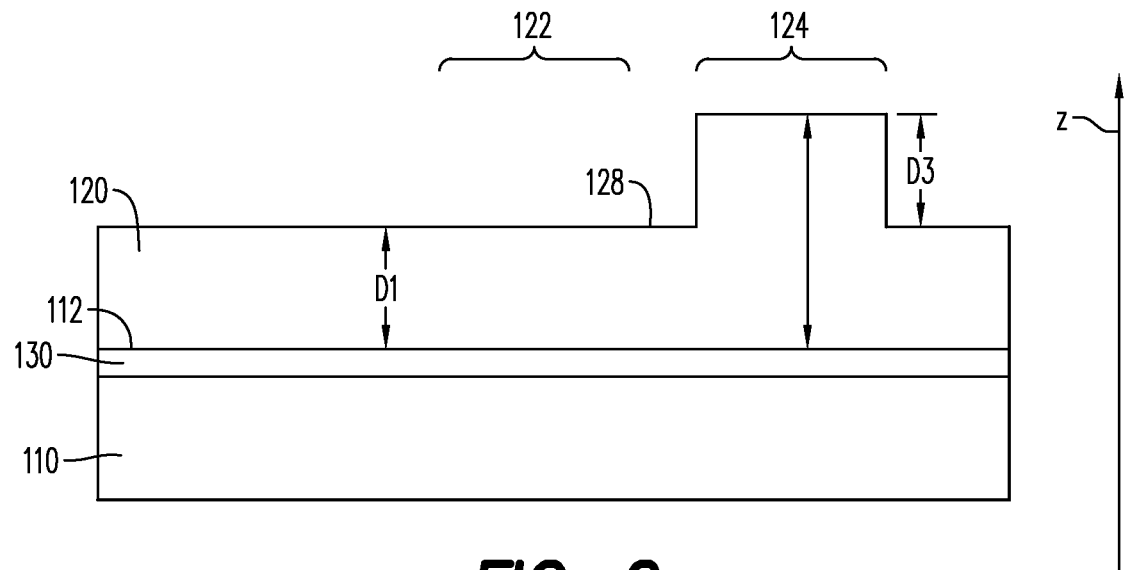
FIG. 2 is a cross section view of a cladded article, according to an exemplary embodiment.
Figure 3:
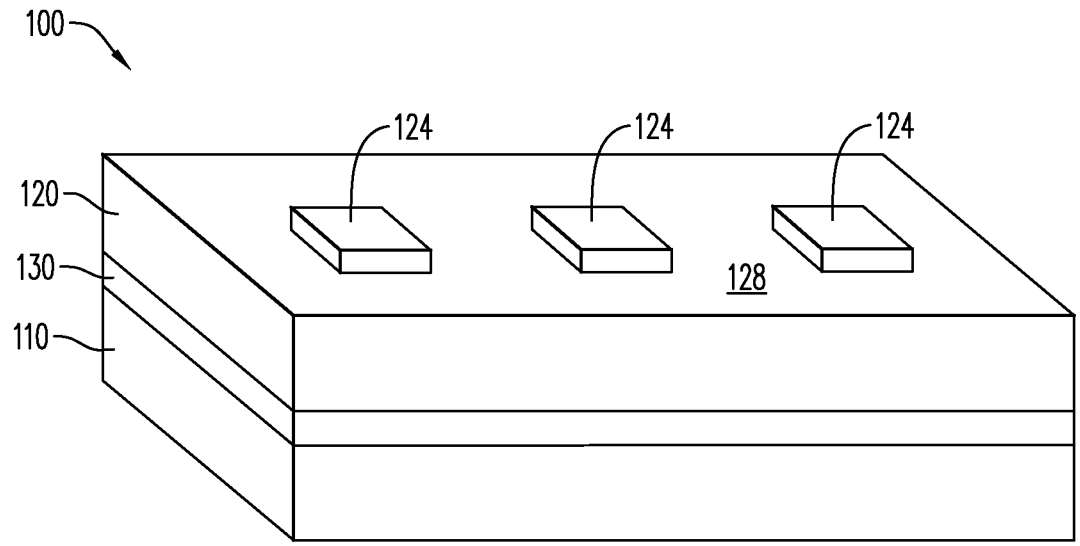
FIG. 3 is a perspective view of a cladded article, according to an exemplary embodiment.

As seen in present FIG. 2, the clad layer 120 may include a first clad layer region 122 having a first clad layer thickness D1 in a thickness direction Z of the clad layer 120. In an exemplary embodiment, the first clad layer thickness D1 may range from approximately 0.1 mm to approximately 51 mm (i.e., approximately 2 inches). It may be understood that when the first clad layer thickness D1 becomes substantially larger than 51 mm, it may become difficult to perform solid-state welding between the clad layer 120 and the first metallic layer 110. The clad layer 120 may further include a second clad layer region 124 having a second clad layer thickness D2 in the thickness direction Z of the clad layer 120. The second clad layer thickness D2 may be greater than the first clad layer thickness D1. The second clad layer thickness may be any size to suit the desired application. It will be understood that, in general, a clad layer being formed of a uniform thickness D1 will have a thickness manufacturing tolerance associated with it. For example, if an exemplary embodiment of a clad layer has a desired uniform thickness of 1 mm, the actual produced clad layer may have a thickness in any one spot of 1 mm+/−x, x being the thickness manufacturing tolerance. It will be understood that in the cladded article 100, a difference D3 between the first clad layer thickness D1 and the second clad layer thickness D2 may be greater than the thickness manufacturing tolerance of a clad layer having a uniform thickness equal to D1. In other words, the variation in the thickness of cladded article 100 is by design and is not merely a byproduct of manufacturing tolerances.

Figure 4:
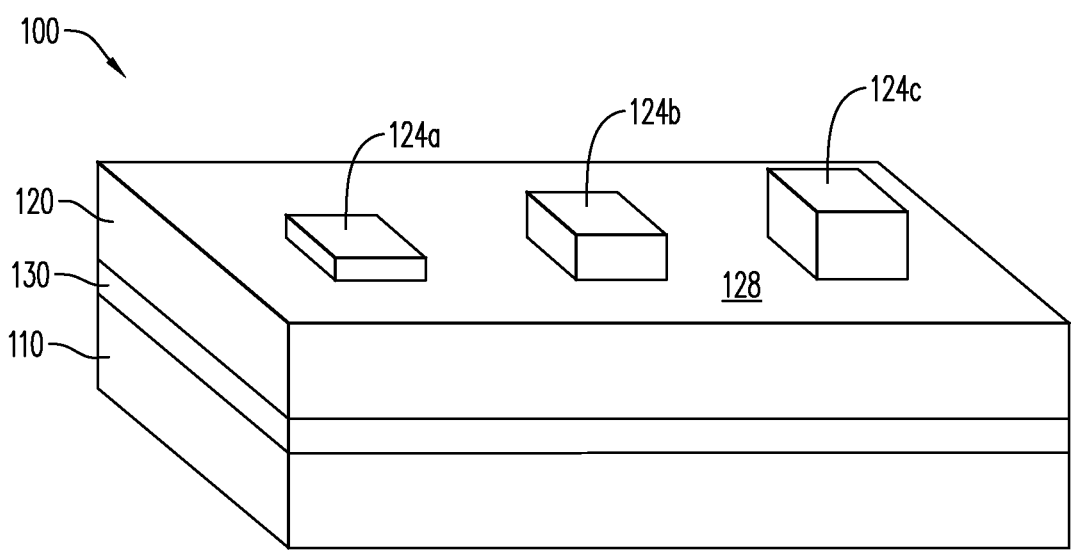
FIG. 4 is a perspective view of a cladded article, according to an exemplary embodiment.
Figure 5:
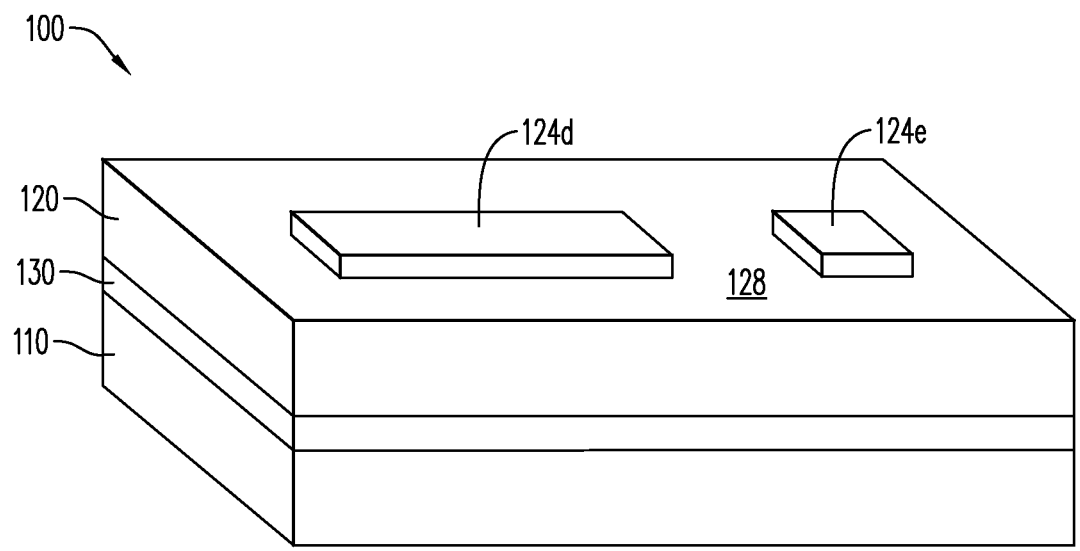
FIG. 5 is a perspective view of a cladded article, according to an exemplary embodiment.
Figure 6:
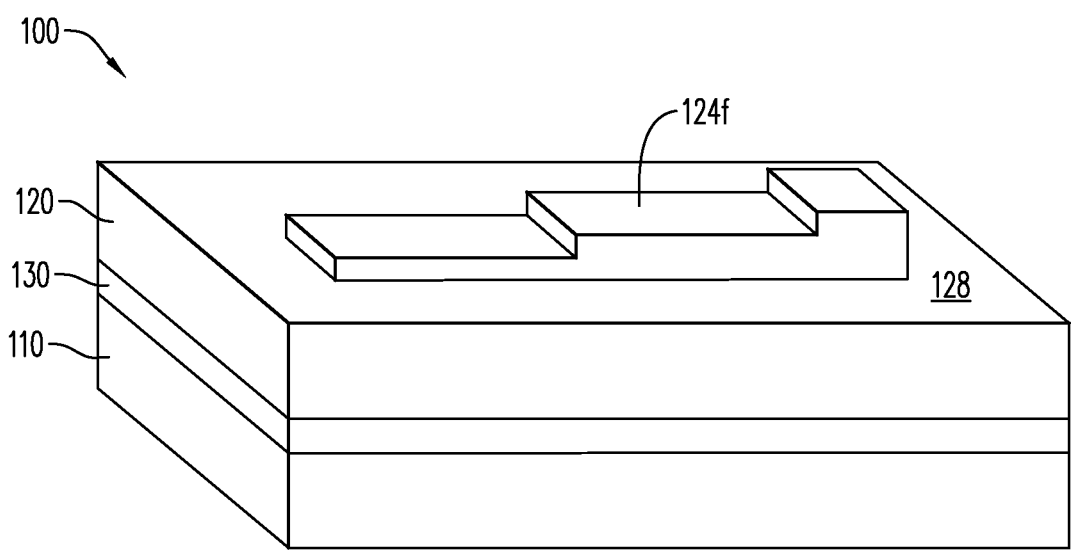
FIG. 6 is a perspective view of a cladded article, according to an exemplary embodiment.
Figure 7:
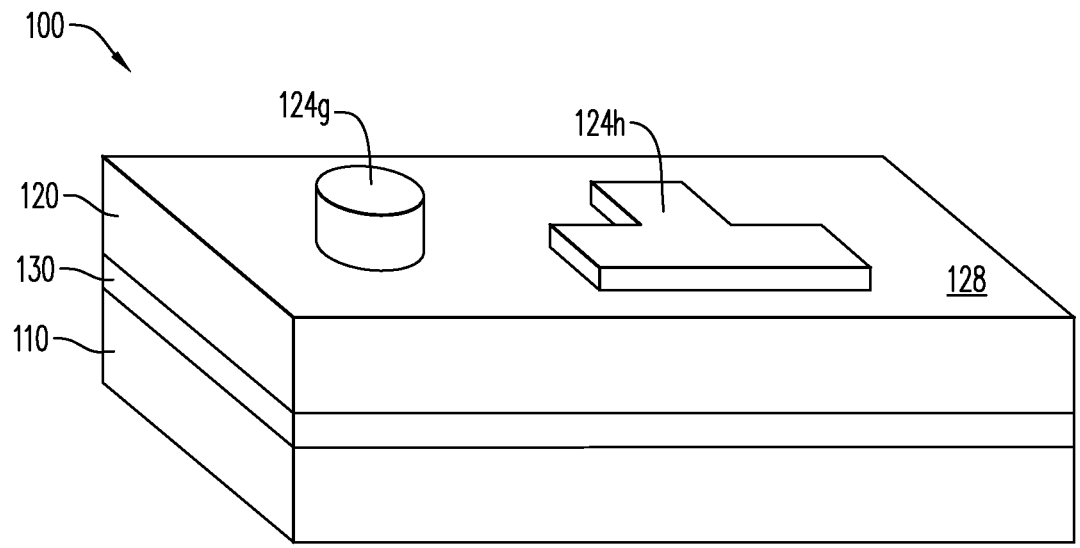
FIG. 7 is a perspective view of a cladded article, according to an exemplary embodiment.
Figure 8:
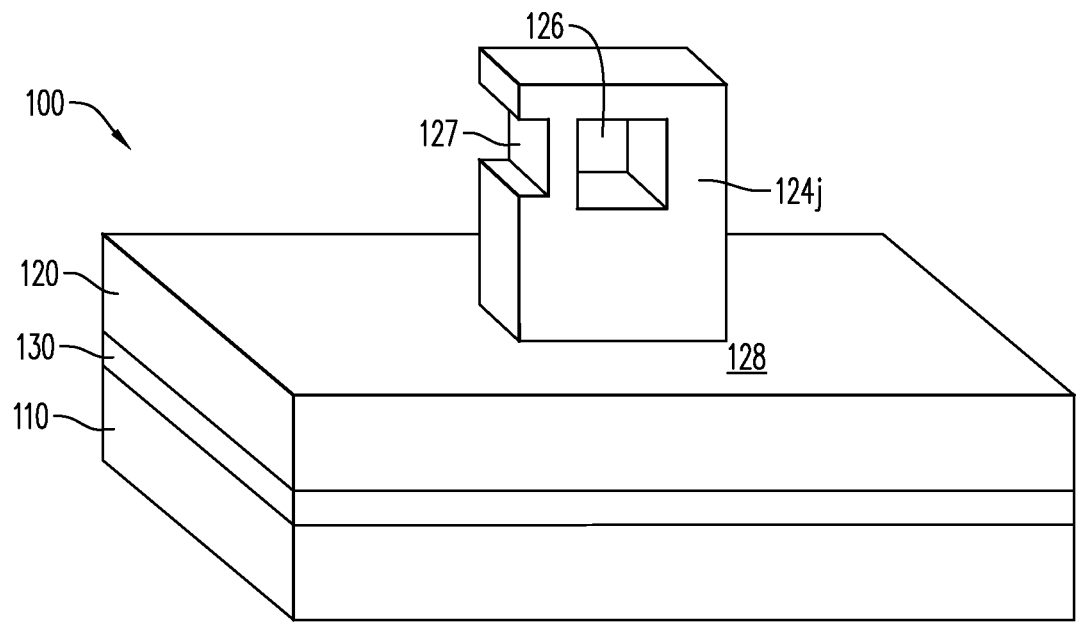
FIG. 8 is a perspective view of a cladded article, according to an exemplary embodiment.

FIGS. 3-8 show exemplary embodiments illustrating possible variations in the size and shape of the second clad layer region. For example, in FIG. 3, a plurality of identical second clad layer regions 124 are provided. However, it will be understood that each second clad layer region 124 of the plurality of clad layer regions 124 does not need to be identical. For example, FIG. 4 shows an exemplary embodiment in which the second clad layer regions 124a, 124b, and 124c vary in thickness. FIG. 5 shows an exemplary embodiment in which lengths and/or widths of second clad layer regions 124d, 124e may be varied. FIG. 6 shows an exemplary embodiment in which a thickness of the second clad layer region 124f can be varied within the second clad layer region 124f. FIG. 7 shows exemplary embodiment illustrating that the second clad layer region 124 is not limited to a specific shape. For example, the second clad layer region 124g may have a curved or circular shape, or the second clad layer region 124h may have an irregular polygon shape. In some cases, the second clad layer region 124 may require a complex three-dimensional (3D) shape in order to couple or interact with other pieces. FIG. 8 shows an exemplary embodiment where the second clad layer region 124j may include a through hole 126 or a notch 127 for mechanically fitting or coupling with other pieces.

The examples above describe that the first metallic layer 110 and the clad layer 120 may be bonded through a solid-state welding method. Solid-state welding may include a group of welding processes producing bonds/welds between structural elements at temperatures below the melting point of the base materials being joined, without the addition of brazing filler metal. In an exemplary embodiment, solid-state welding may be described as a bonding/welding process (i) without putting a portion of the structural elements through liquid or vapor phase, (ii) with the use of pressure, and (iii) with or without the aid of temperature. Solid-state welding is done over a wide range of pressure and temperature, with appreciable deformation and solid-state diffusion of the base materials. Solid-state welding processes include cold welding, diffusion welding, explosion welding, forge welding, friction welding, hot pressure welding, roll welding, and ultrasonic welding.

Explosion welding ("EXW") is a solid-state welding technique using controlled detonations to force dissimilar metals into a high-quality, metallurgically bonded joint. The transition joint between the dissimilar metals has high mechanical strength, is ultra-high vacuum tight and can withstand drastic thermal excursions. EXW is a solid-phase process where welding or cladding two metals together is accomplished by accelerating one of the components at extremely high velocity through the use of explosives. The process is solid-phase because both components are, at all times, in a solid state of matter. This may be contrasted with other metal-to-metal welding or cladding techniques such as arc-welding, gas welding, hot-dipping, electroplating and vapor deposition, which require at least one component to be liquified, gasified or ionized.

EXW being a solid-state process, it will typically subject both dissimilar metals to far lower process temperatures than liquid or gas-state processes. The crystalline structure of a metal is highly dependent upon the temperatures to which it has been exposed. For some metals, exposure to high temperature processes can alter the physical characteristics of the metal in very detrimental ways, e.g., rendering the metal too brittle for a given application. EXW is commonly utilized to clad carbon steel plate with a thin layer of corrosion resistant material. For example, stainless steel, nickel alloy, titanium, zirconium, silver, and tantalum are non-limiting examples of materials used for the clad layer 120 as shown in FIGS. 1-8. It will be understood that the clad layer material 120 is not limited to these materials, and other materials may be used as warranted by the particular application. Additionally, other materials aside from carbon steel may be used as the first metallic layer 110.

Typical geometries produced by EXW include plates, tubing, tube sheets and cylinders. While either surface, i.e., inner or outer, of tubing and tube sheets may be the cladder layer, for solid cylinders only the external surface may be the cladder layer, for the readily apparent reason that explosives cannot be disposed in a solid cylinder. While limitations, at least from an efficiency perspective, do exist for initial formation of a geometry by EXW, modifications may be made to the standard geometries. That is, once the clad layer is formed by EXW, the clad plate, clad tube, clad tube sheet or clad cylinder may be subjected to a number of post-cladding processes resulting in numerous different shapes. Essentially any forming/machining process may be applied to the clad structure that will not degrade the clad layer.

EXW can produce a bond between two metals that cannot necessarily be welded or otherwise joined together by conventional means. The process does not melt either metal, instead the surfaces of both metals are plasticized while, simultaneously, coming into intimate contact with each other. The plasticization and contact are sufficient to create a weld. This is a similar principle to other non-fusion welding techniques, such as friction welding. Large areas can be bonded extremely quickly and the weld itself is very clean, due to the fact that the surface material of both metals is violently expelled during the reaction. EXW can join a wide array of similar and dissimilar metals.

Figure 17:
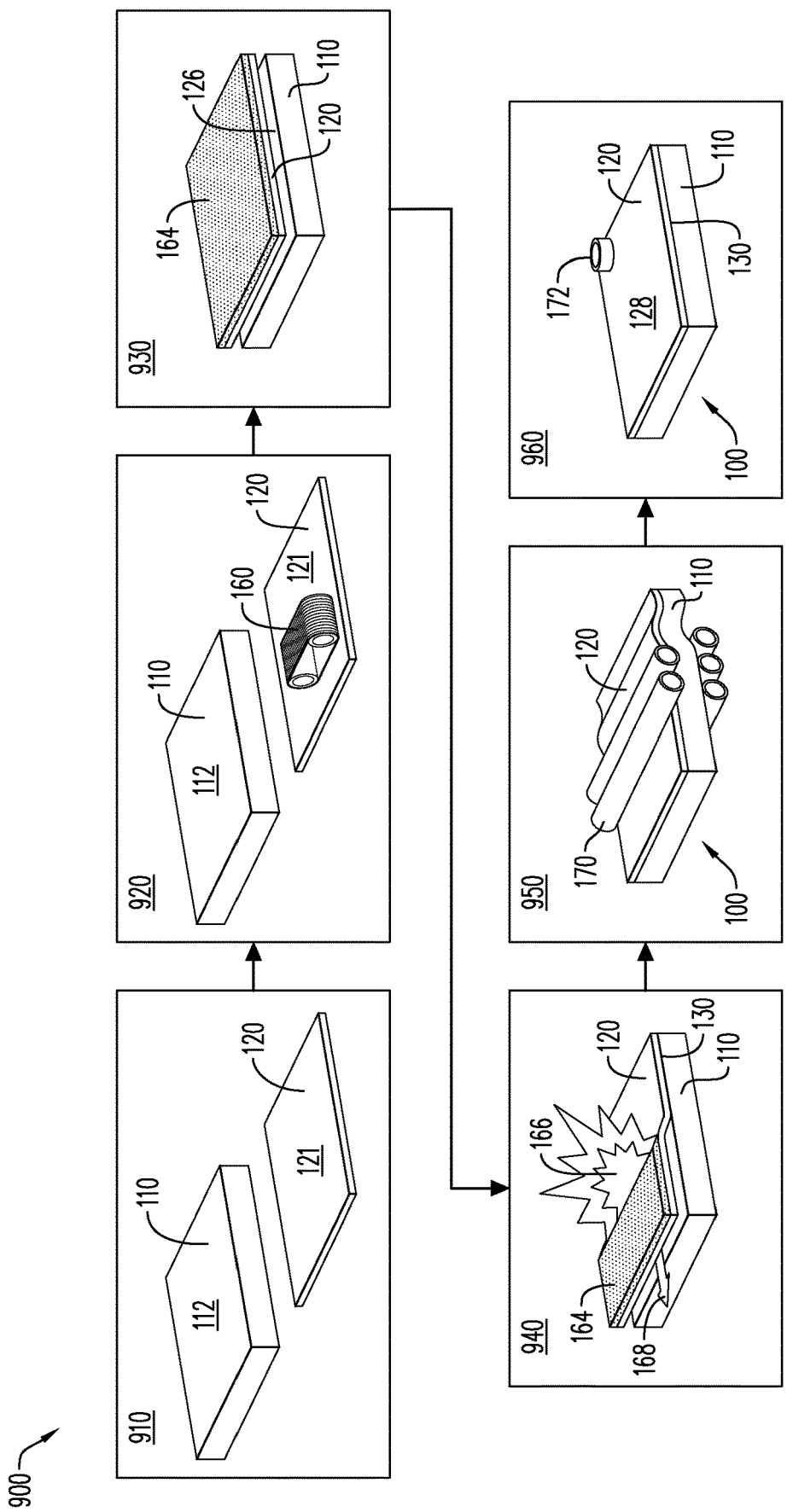
FIG. 17 is an explanatory schematic drawing showing steps of preparing a cladded article through explosive welding.

FIG. 17 shows an exemplary embodiment of a method 900 for explosively welding a first metallic layer 110 and a clad layer 120 to generate a cladded article 100. In block 910, the first metallic layer 100 and the clad layer 120 are separately prepared and inspected. It will be noted that in explosive welding, it may be important for the clad layer 120 to have a substantially uniform thickness, otherwise the geometry of forces applied during the explosive welding may be sub-optimal, resulting in a low-quality weld. In block 920, mating surfaces of the metallic layer 110 and the clad layer 120, i.e., a metallic layer mating surface 112 and a clad layer mating surface 121, may be ground by a grinder 160. In block 930, the clad layer 120 may be positioned with the clad layer mating surface 121 facing the metallic layer mating surface 112 with a predetermined gap 126 provided therebetween. Explosive material 164 may be layered over the clad layer 120. In block 940, the explosive material 164 is detonated starting at a first side and progressing to an opposite side as illustrated by arrow 168. The force of the explosion 166 propels the clad layer 120 against the metallic layer 110 thereby forming the first solid-state welding interface region 130 therebetween. In block 950, rollers 170 are applied to the cladded article 100 to flatten it. In block 960, the cladded article undergoes quality testing. For example, an ultrasonic probe 172 may be used over an outer surface 128 of the clad layer 120 to check for high quality bonds between the clad layer 120 and the first metallic layer 110.

Figure 9:
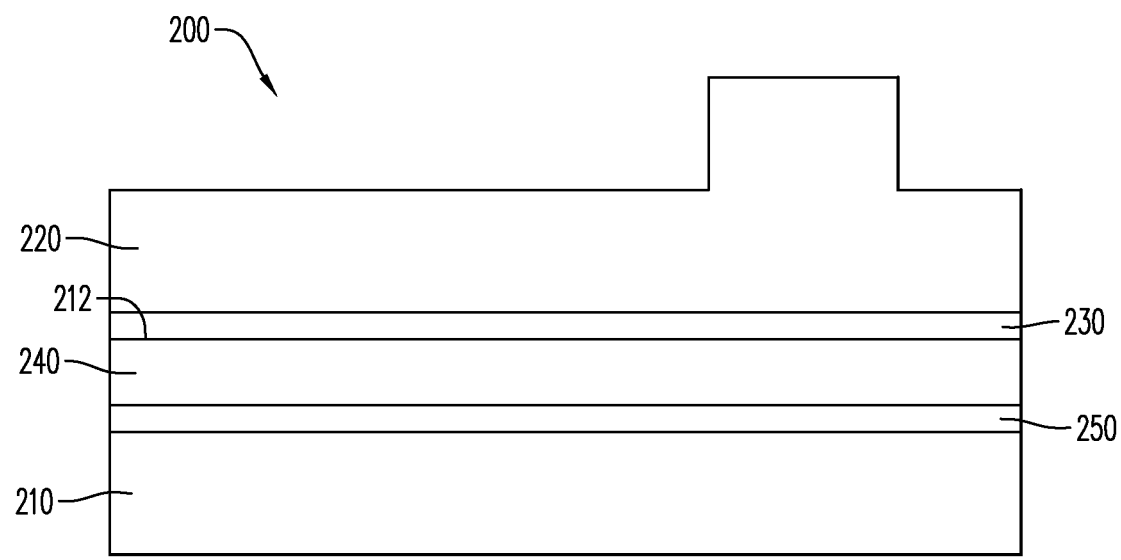
FIG. 9 is a cross section view of a cladded article, according to an exemplary embodiment.

While the exemplary embodiment described above has the first metallic layer 110 directly bonded to the clad layer 120, it will be understood that in some embodiment, an interlayer may be provided between the first metallic layer 110 and the clad layer 120. For example, FIG. 9 shows an exemplary embodiment of a cladded article 200 using an interlayer. The cladded article may include a first metallic layer 240, a second metallic layer 210, and a clad layer 220. The second metallic layer 210 may be a base layer, and the first metallic layer 240 may be an interlayer. The first metallic layer 240 may be formed of material comprising copper, for example. A first metallic layer surface 212 of the first metallic layer 240 may be bonded to the clad layer 220 via a first solid-state welding interface region 230. Additionally, the first metallic layer 240 may be bonded to the second metallic layer 210 via a second solid-state welding interface region 250 on a side opposite the first metallic layer surface 212. In an exemplary embodiment, the first solid-state welding interface region 230 and the second solid-state welding interface region 250 may be a first explosion welding interface region and a second explosion welding interface region.

Figure 10:
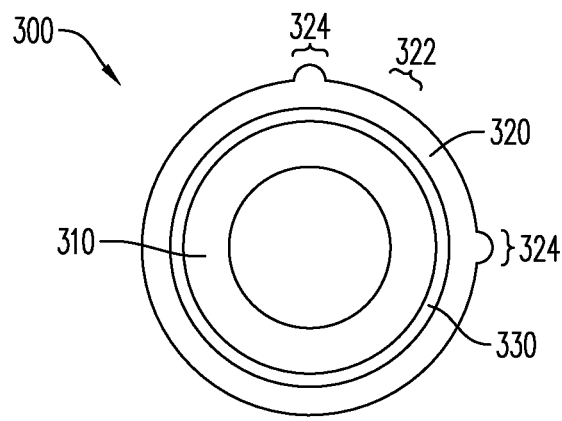
FIG. 10 is a cross section view of a cladded article, according to an exemplary embodiment.

The exemplary embodiments described above show the cladded article 100 and the cladded article 200 as flat plate-like structures. However, it will be understood that any shape or form suitable for cladding, such as pipes, tubes, cylinders, and/or any other suitable shape. For example, FIG. 10 shows an exemplary embodiment a pipe-form cladded article 300 having a first metallic layer 310 and a clad layer 320. The first metallic layer 310 and the clad layer 320 may be bonded together by a first solid-state welding interface region 330 positioned between the clad layer 320 and the first metallic layer 310. The clad layer 320 may have a first clad layer region 322 and a second clad layer region 324 having a larger thickness than the first clad layer region 322.

Figure 11:
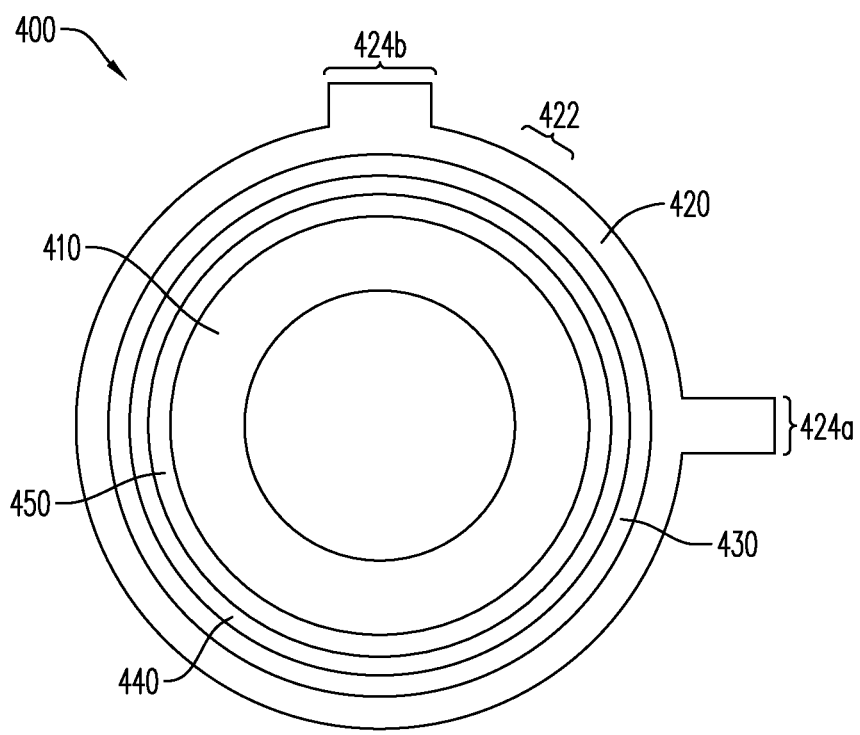
FIG. 11 is a cross section view of a cladded article, according to an exemplary embodiment.

FIG. 11 shows an exemplary embodiment of a pipe-form cladded article 400 using an interlayer. For example, the cladded article 400 may include a first metallic layer 440, a second metallic layer 410, and a clad layer 420. The first metallic layer 440 may be a copper interlayer, for example. The first metallic layer 440 and the clad layer 420 may be bonded together via a first solid-state welding interface region 430. Additionally, the first metallic layer 440 and the second metallic layer 410 may be bonded together via a second solid-state welding interface region 450. The clad layer 420 may have a first clad layer region 422 and second clad layer regions 424*a*, 424*b* having larger thicknesses than the first clad layer region 422.

Figure 12:
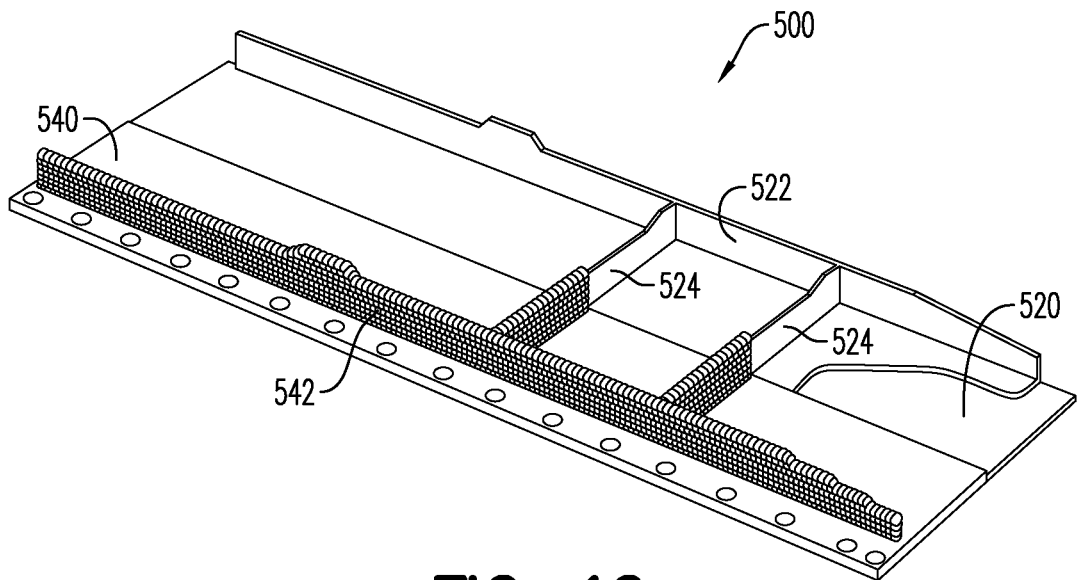
FIG. 12 is a perspective view of a cladded article, according to an exemplary embodiment.
Figure 13:
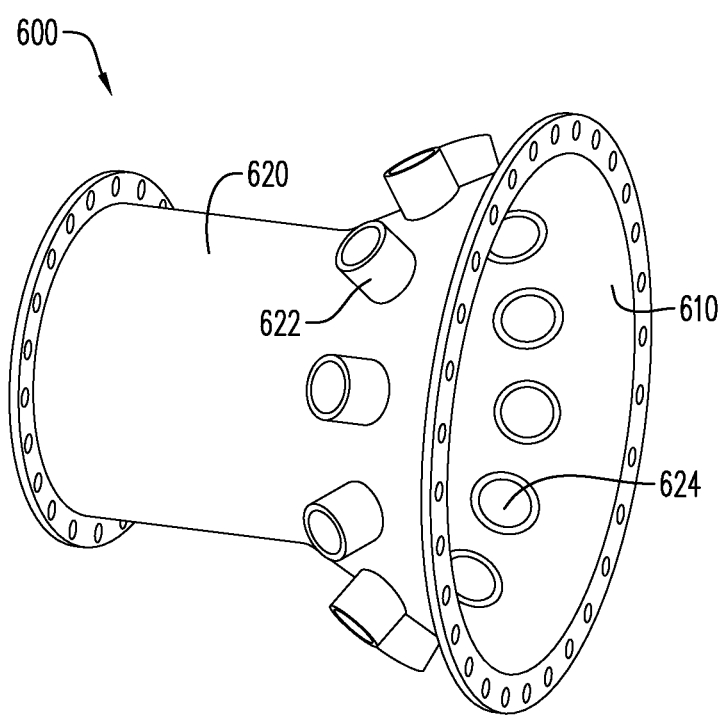
FIG. 13 is a perspective view of a cladded article, according to an exemplary embodiment.

FIGS. 12-13 show additional exemplary embodiments of cladded articles with varying thickness clad layers. For example, FIG. 12 shows a cladded article 500, approximately half of which has been subjected to finishing processing. FIG. 12 further shows a finished clad surface 520 and an unfinished clad surface 540. The varying thickness region of the clad layer may take the form of finished side rib 522, unfinished side rib 542, and cross ribs 524.

FIG. 13 shows an exemplary embodiment of a cladded article 600 in which an outer layer 620 is a base material, and an inner layer 610 is a clad material. Ducts 622 may be formed of a same material as the inner layer 610 and are built up through the outer layer 620. Holes 624 may be preformed in the outer layer 620 and the inner layer 610, or may be formed by machining after the formation of the bodies of the ducts 622.

Figure 14:
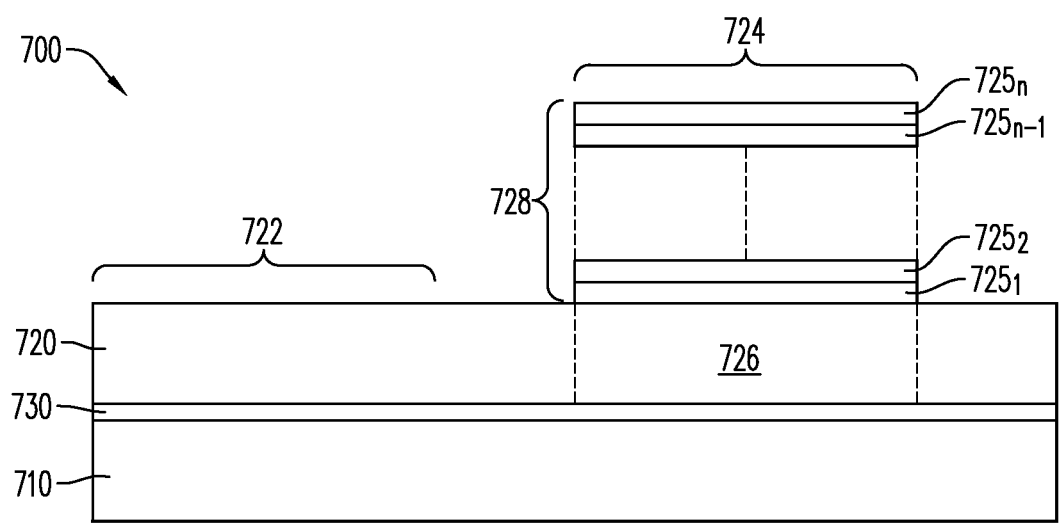
FIG. 14 is a cross section view of a cladded article, according to an exemplary embodiment.

FIG. 14 shows an exemplary embodiment of a cladded article 700 that may be used in construction of a pressure vessel or reaction chamber. The cladded article 700 may include a base layer 710 and a clad layer 720. The base layer 710 and the clad layer 720 may be bonded via a solid-state welding interface region 730. The base layer 710 may be formed of a material such as stainless steel, carbon steel, titanium, or any other material that may be suitable for forming a pressure vessel. The clad layer 720 may be formed of pure tantalum or a tantalum alloy, or another corrosive-resistant material used for a reaction chamber. In an exemplary embodiment, the clad layer 720 may be formed of a tantalum alloy comprising 2.5% tungsten. Materials such as tantalum can be quite expensive, and, accordingly, it is desirable to minimize the use of these materials as much as possible to reduce production costs. On the other hand, when joining the cladded article 700 with other cladded articles to form the finished reaction chamber, it may be useful to have thick regions of the clad layer 720 in order to provide more material for bonding parts together and creating a higher quality joint. For example, a material like tantalum may have a substantially higher melting point than the underlying base layer 710. Accordingly, heating the clad layer 720 for bonding to another cladded article may warp or damage the underlying base layer 710. Accordingly, it may be desirable to have a thicker layer of tantalum where joints are to be made, to better insulate the underlying base layer 710 from thermal damage. To address these competing interests, the cladded article 700 may include a first clad layer region 722 in which the thickness of the clad layer 720 is a substantially uniform first thickness. Additionally, the cladded article 700 may include a second clad layer region 724 that has a second thickness larger than the first thickness. The second clad layer region 724 may include an underlying portion 726 of the clad layer 720 and a clad layer projection 728 bonded to the underlying portion 726. In an exemplary embodiment, the second clad layer region 724 may be provided in areas where a larger thickness is needed for bonding. Accordingly, production costs can be substantially reduced by only providing the extra material where needed.

The second clad layer region 724 may be formed by layering a plurality of foils 725. In other words, the clad layer projection 728 may comprise a plurality of layered foils 725. FIG. 14 shows that the second clad layer region may be formed by layering the foils $725_1$, $725_2$, ..., $725_{n-1}$, $725_n$, where n is an integer representing the total number of foils. While FIG. 14 shows at least four foils 725, it will be understood that more or less than four foils may be used. For example, the second clad layer region 724 may comprise a single foil bonded to the clad layer 720. Alternatively, any number of foils greater than four may be used to achieve any desired thickness of the second clad layer region. In an exemplary embodiment, the foils 725 may be formed of a similar material as the clad layer 720. For example, the foils 725 may be formed from tantalum or a tantalum alloy. Alternatively, in an exemplary embodiment, the foils 725 may be formed of different materials. For example, the foils may be arranged in an alternating pattern of Ta, W, Ta, W, etc., or an alternating pattern of Ta, Cu, Ta, Cu, etc.

In an exemplary embodiment, a thickness of each foil 725 may be in a range of approximately 0.005 inches to approximately 0.008 inches. In an exemplary embodiment, a total thickness of the second clad layer region 724 may be 0.020 inches above a surface of the clad layer 720. However, it will be understood that smaller and larger thickness may also be obtained depending on the needs of the desired application.

Figure 15:
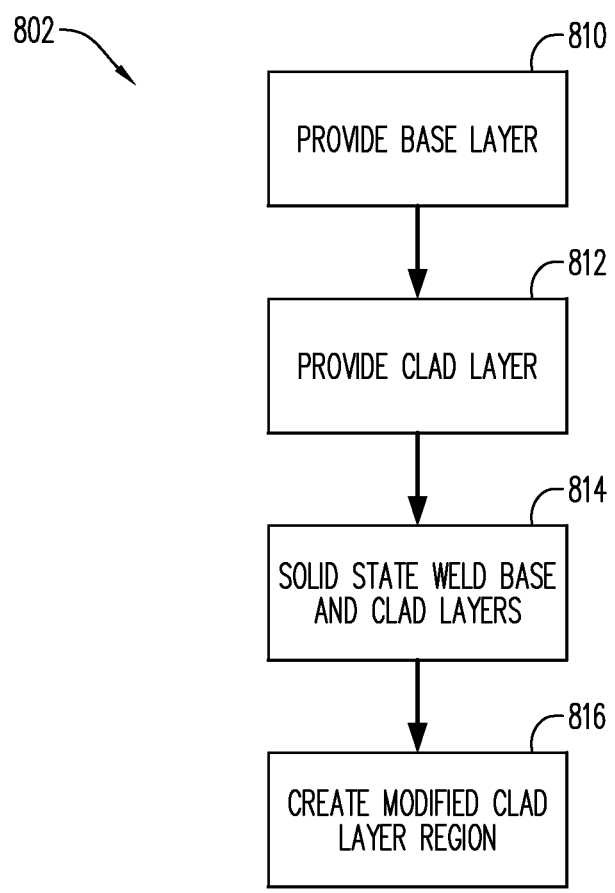
FIG. 15 is a flowchart illustrating a method for manufacturing a cladded article, according to an exemplary embodiment.

FIG. 15 shows an exemplary embodiment of a method 800 for manufacturing a cladded article with a clad layer having a varying thickness. For example, in block 810, a first metallic layer is provided, such as the base layer 710 shown in FIG. 14. In block 812 a clad layer is provided, such as clad layer 720 show in FIG. 14. In block 814, the first metallic layer and the base layer may be bonded together via solid-state welding. The solid-state welding may be an explosive welding process, or any other suitable solid-state welding process as described above. The solid-state welding may be achieved by any of the methods described above. In block 816, a modified clad layer region, such as the second clad layer region 724 shown in FIG. 14, may be created by bonding material to an outer surface of the clad layer opposite the first metallic layer. In an exemplary embodiment, block 816 may include creating a plurality of modified clad layer regions, such as the second clad layer regions 124a, 124b, and 124c shown in FIG. 4.

Figure 16:
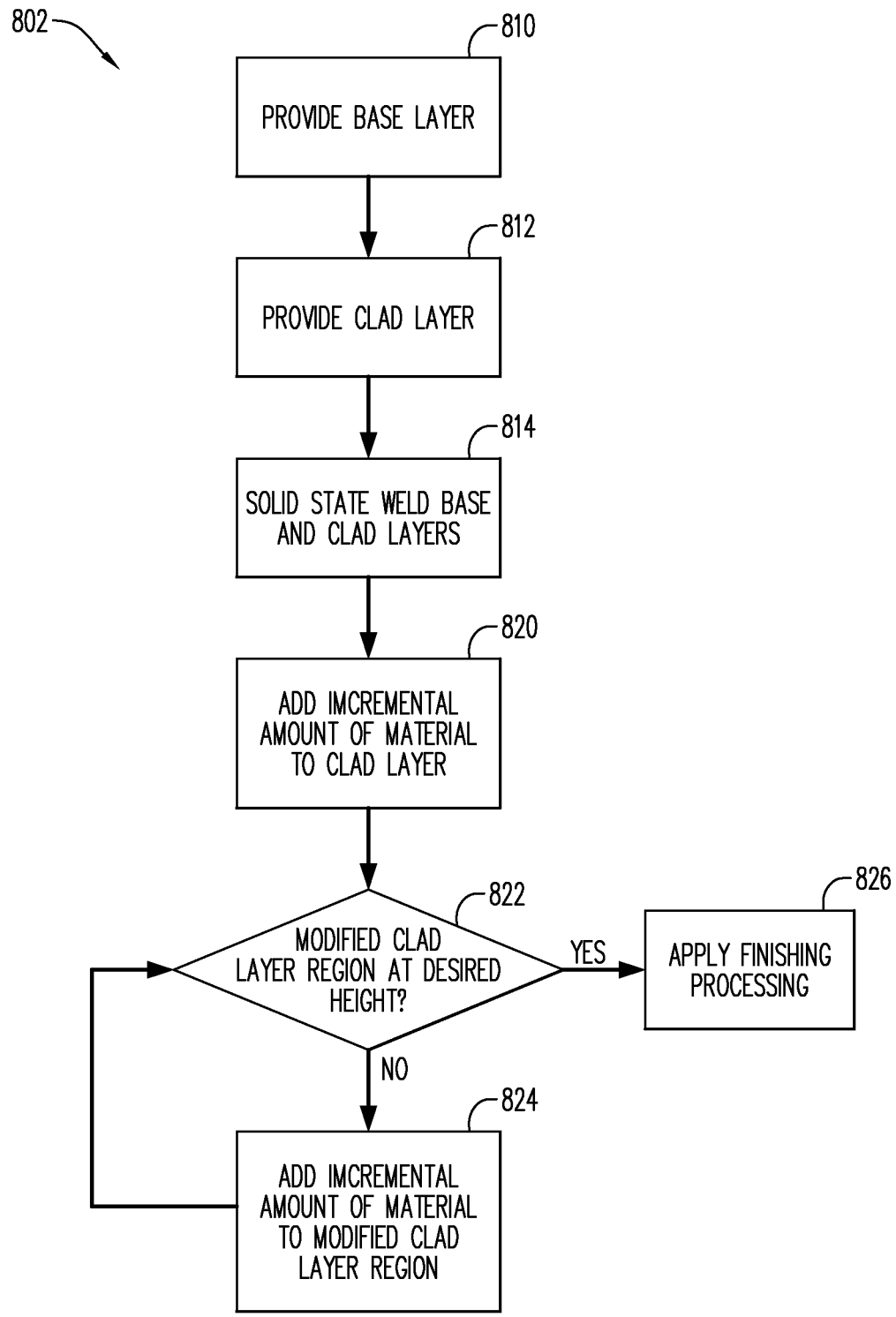
FIG. 16 is a flowchart illustrating a method for manufacturing a cladded article, according to an exemplary embodiment.

FIG. 16 shows an exemplary embodiment of a method 802 for manufacturing a cladded article with a clad layer having a varying thickness. For example, in block 810, a first metallic layer is provided, such as the base layer 710 shown in FIG. 14. In block 812 a clad layer is provided, such as clad layer 720 show in FIG. 14. In block 814, the first metallic layer and the base layer may be bonded together via solid-state welding. The solid-state welding may be an explosive welding process, or any other suitable solid-state welding process as described above. The solid-state welding may be achieved by any of the methods described above. In block 820, an incremental amount of material is bonded to an outer surface of the clad layer opposite the first metallic layer to form a modified clad layer region, such as the foil $725_1$ shown in FIG. 14. In the case of the foil $725_1$, the foil $725_1$ may be solid-state welded to the clad layer 720. In an exemplary embodiment, the solid-state welding may be ultrasonic welding, but is not limited to that method. In block 822, it is determined whether the modified clad layer region is at a desired height. If the modified clad layer region is not at the desired height (i.e., "no" at block 822), then the method proceeds to block 824, where an incremental amount of material is bonded to the modified clad layer region, such as the foil $725_2$ shown in FIG. 14. In the case of the foil $725_2$, the foil $725_2$ may be bonded to the foil $725_1$ via solid-state welding. In an exemplary embodiment, the solid-state welding may be ultrasonic welding, but is not limited to that method. The method then returns to block 822. The loop of block 822 and 824 may be repeated as many times as necessary to achieve the desired height of the modified clad layer region. Once the desired height of the modified clad layer region is obtained, the method may proceed to block 826, where finishing processing may be applied. Finishing processing may include, but is not limited to, processes such as polishing, buffing, machining, etching, etc., to achieve a desired final shape and texture.

In the method 802 described above, an ultrasonic welding process is described as one possible method for creating the modified clad layer region. However, it will be understood that a variety of processes may be used to bond material to the clad layer and form the modified clad layer region, including, but not limited to, a powder bed fusion process, a directed energy deposition process, a sheet lamination process, a friction welding process, a friction stir welding process, a cold metal transfer process, a resistance welding process, a kinetic metallization process such as a cold spray deposition process or a warm spray deposition process, a binder jet printing process, a plasma spray process.

A cold spray deposition process may include accelerating a powdered material in a gas jet to collide with a substrate. When colliding with the substrate, particles of the powered material may undergo plastic deformation and adhere to a surface of the substrate. A warm spray deposition process may be similar to the cold spray deposition process, except that the particles of the powered material are heated before collision. The temperature of the particles will be less than the melting point of the powered material in a warm spray deposition process.

Powder bed fusion ("PBF") is a process that may be used with a variety of techniques such as direct metal laser melting, electron beam melting, directed metal laser sintering, selective laser melting, selective laser sintering, and selective heat sintering. PBF begins with a powder and involves melting the powder to a sufficient degree for the particles to fuse together. Particles may be "sintered" (partially melted) or fully melted in a PBF process. Thermal energy in the form of a laser, beams of electrons, or a heated print head partially or fully melt the powder. PBF adds an ultrathin layer of powdered material over the preceding layer of beginning substrate. The layer may be spread by a roller or blade. Powder may be fed from a reservoir beneath or next to a build platform that lowers to accommodate each successive layer of powder. Powder may be fused to the entirety or selected portion of the underlying structure using a laser, electron beam light source, visible light source, or simply a heat source. At the conclusion of the process, the unfused powder may be blown or blasted away.

Figure 18:
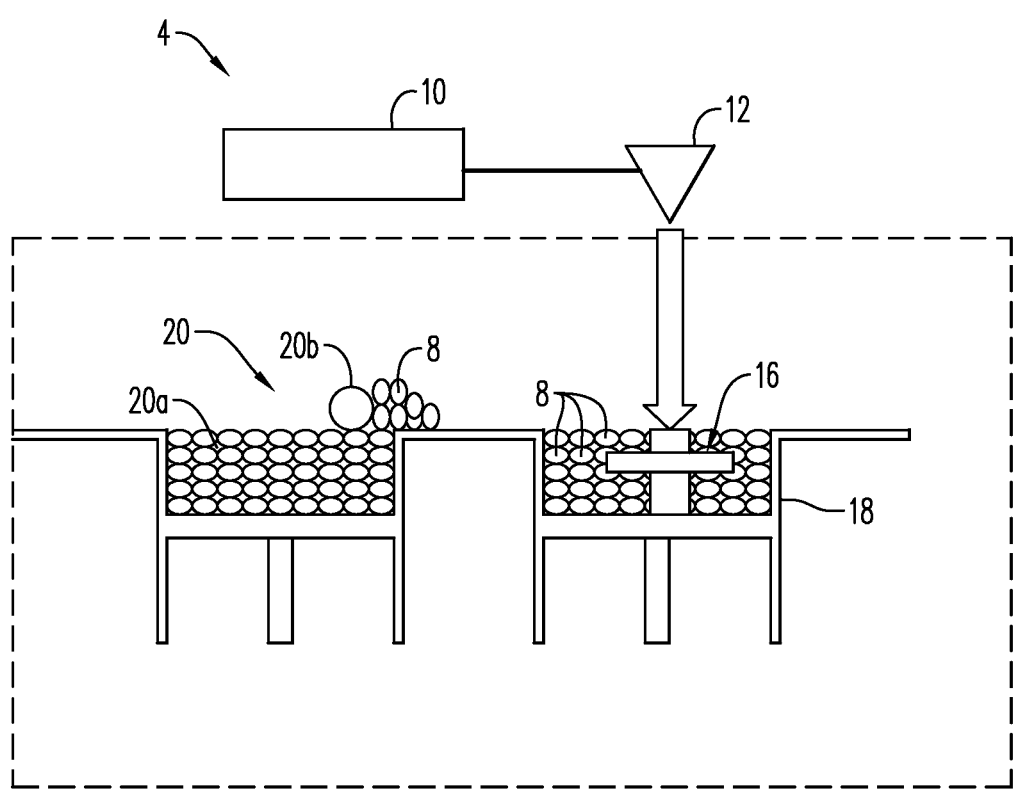
FIG. 18 is a schematic drawing showing a powder bed apparatus according to an exemplary embodiment.

FIG. 18 shows an exemplary embodiment of a powder bed manufacturing system 4. In the system 4, the component 16 may be built up layer-by-layer by aiming a laser 10 at powder 8 via scanner 12. The powder 8 may be contained in powder bed 18, and the portion of the powder 8 being acted upon by laser 10 may disposed on previously solidified portions of component 16. The powder 8 may constantly supplied to powder bed 18 by powder delivery system 20 that may include a powder reservoir 20a and a rake or roller 20b.

Figure 19:
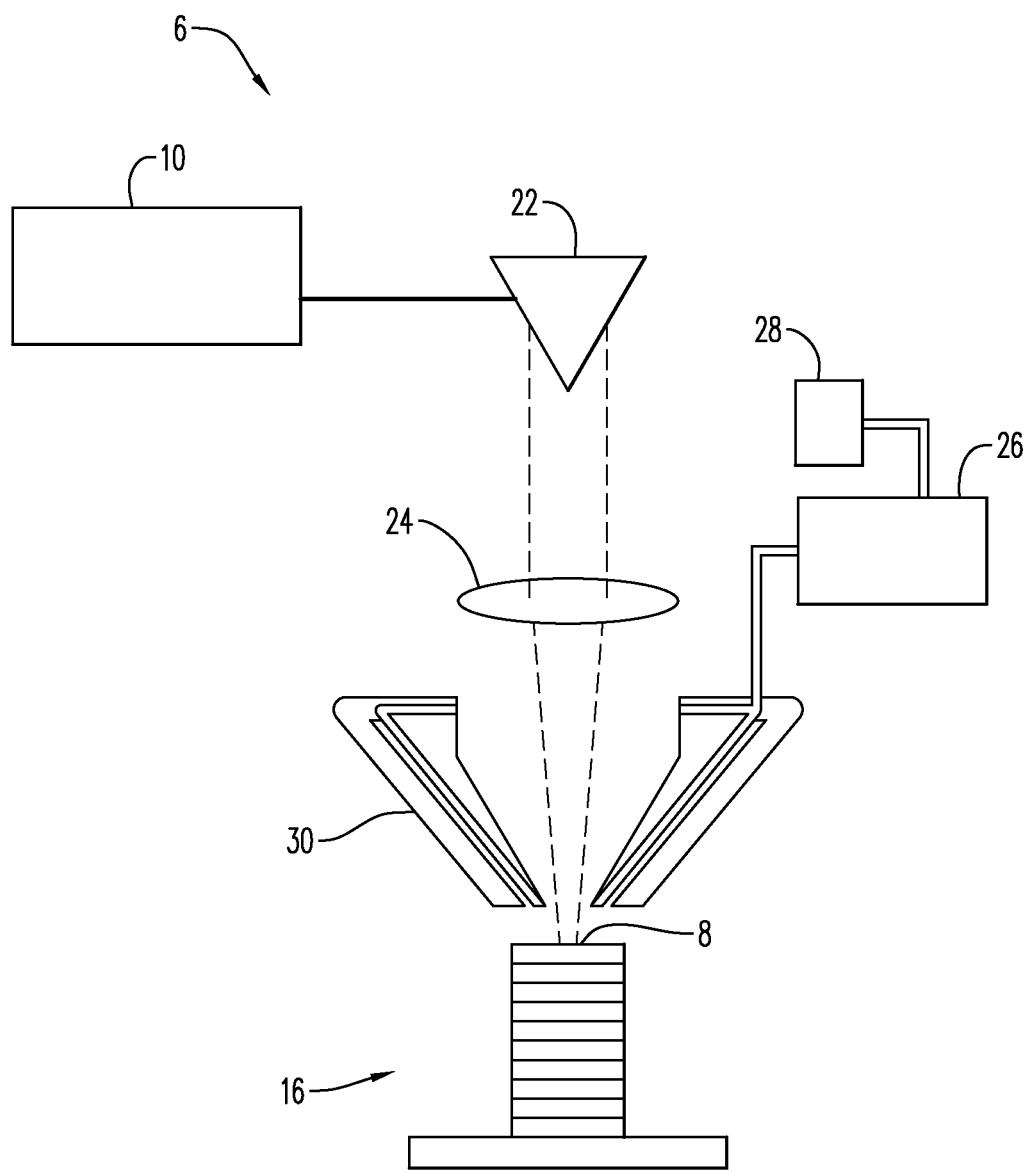
FIG. 19 is a schematic drawing showing a powder feed apparatus according to an exemplary embodiment.

FIG. 19 shows an exemplary embodiment of a powder feed manufacturing system 6. In the system 6, the component 16 may be built up layer-by-layer by aiming a laser 10 at powder 8 via beam guidance system 22 and lens 24. The powder 8 may be contained in a powder supply 26 and may be directed to proper position by a deposition head 30. A carrier gas 28 may convey the powder 8 to the proper position on the previously solidified portions of component 16. Laser 10 may selectively act upon a portion of the powder 8 disposed on previously solidified portions of the component 16. Powder that has not been acted upon by laser 10 may be periodically removed from the component, e.g., between layer formations.

Directed energy deposition ("DED") may utilize highly focused thermal energy delivered via laser, electron beam, or plasma arc to melt and fuse material jetted into the heated chamber from either powdered metal or wire filament. DED is sometimes referred to as direct metal deposition or metal deposition. The system may feature metal deposition along four or five axes.

Laser engineered net shape technology is a DED based system that dispenses powder from nozzles and selectively melts portions of powder by a laser to build an object. In other words, DED may be used for adding material to existing metal components or metal base materials, such as a clad layer in a cladded article. Other DED based processes may include electron beam additive melting and rapid plasma deposition. In electron beam additive melting, metal melting may occur via an electron beam firing in a vacuum chamber. Either metal powder or wire filament may be fully melted in layers as thin as 20 microns each. In rapid plasma deposition, a plasma arc may melt a wire filament in an argon gas environment to produce parts that may require little or no post-production machining.

Figure 20:
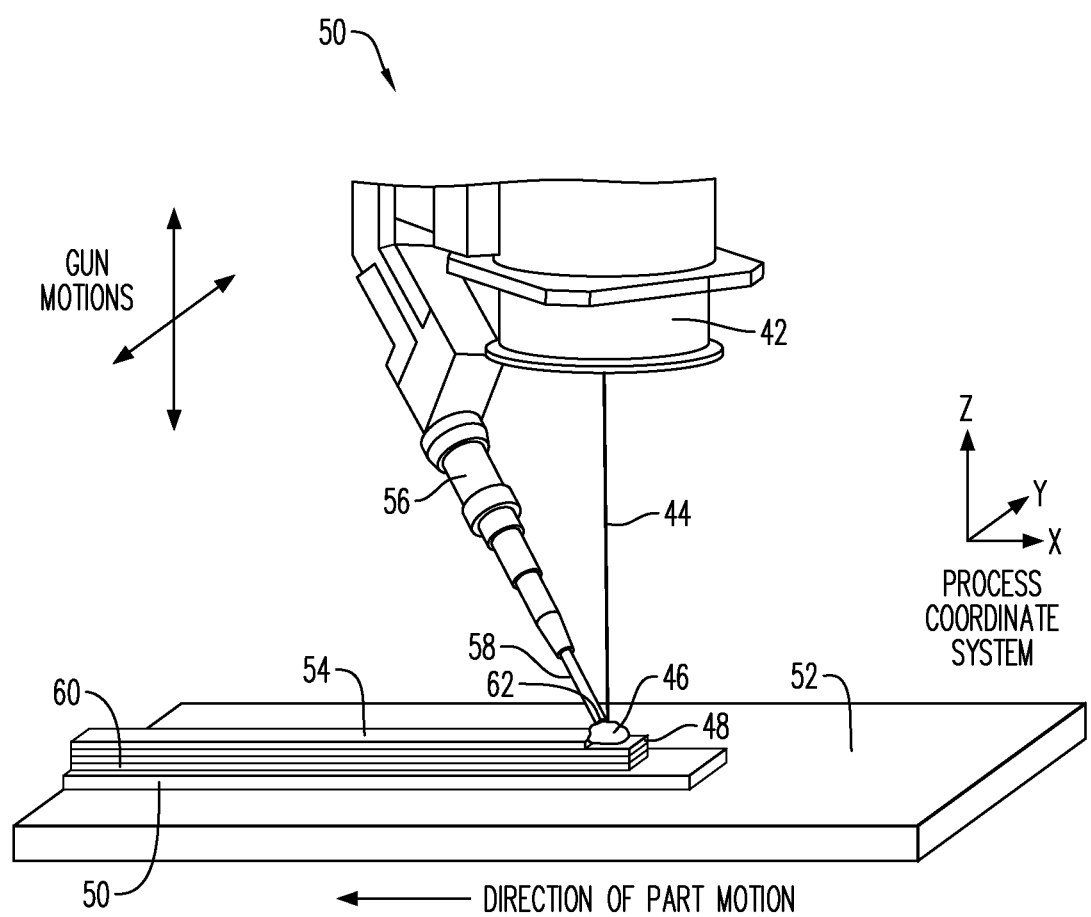
FIG. 20 is a schematic drawing of an electron beam apparatus according to an exemplary embodiment.

FIG. 20 shows an exemplary embodiment of an electron beam DED apparatus 50. Apparatus 50 may include an electron beam ("EB") gun 42, a three-axis manipulator, an electron beam 44 source and a wire feeder 56. Exemplary embodiments may integrate electron beam gun 42 and wire feeder 56, as seen in FIG. 19. The three-axis manipulator may allow relative movement of the working tip 62 of wire 58 to the workpiece 60 in three dimensions, i.e., three axes. The embodiment of FIG. 20 may include a workpiece platform 52 to enable relative movement along the x-axis. Side-to-side movement and up-down movement of the electron beam gun 42 may enable relative movement along, respectively, the y-axis and z-axis.

Electrically powered electron beam gun 42 may produce a directed beam 44 of high velocity electrons. This directed beam 44 may intersect the working tip 62 of wire 58 and, optionally, either the workpiece 60 or the molten alloy puddle 46 that is melted metal from wire 58 but also, possibly, from workpiece 60. Kinetic energy from the electrons may be transformed into heat upon impact with one or more of the working tip 62 of the wire 58, a substrate 50, the workpiece 60 and the molten puddle 46. The heat developed may be sufficient to melt the solid wire 58. As the workpiece platform 52 and the attached workpiece 60 are moved laterally (to the left as shown in FIG. 19), the molten alloy that is no longer being heated by the electron beam 44 is able to cool and, thus, become a re-solidified alloy 54, which is now part of the workpiece 60. Continuous advancement of the wire 58 by the wire feeder 56 in conjunction with movement of the platform 52 maintains the molten alloy puddle 46 at a relatively constant size at a steady working state. The volumetric characteristics of what the re-solidified alloy 54 'adds' to the workpiece with each layer of metal added will depend on the amount of energy added to the solid wire 58 and the molten alloy puddle 46, the movement of the workpiece 60, the cooling parameters of the system and the rate at which the wire 58 exits the wire feeder 56. Modifying these and other parameters allows for varying thickness of the re-solidified alloy 54 layer on top of a prior deposit 48. The width, i.e., y-axis dimension, of the re-solidified alloy 54 may also be variable to at least some extent.

The system 50 may be performed under vacuum conditions to prevent dissipation of the electron beam 44 and heating of the air between the electron beam gun 42 and the wire 58.

Figure 21:
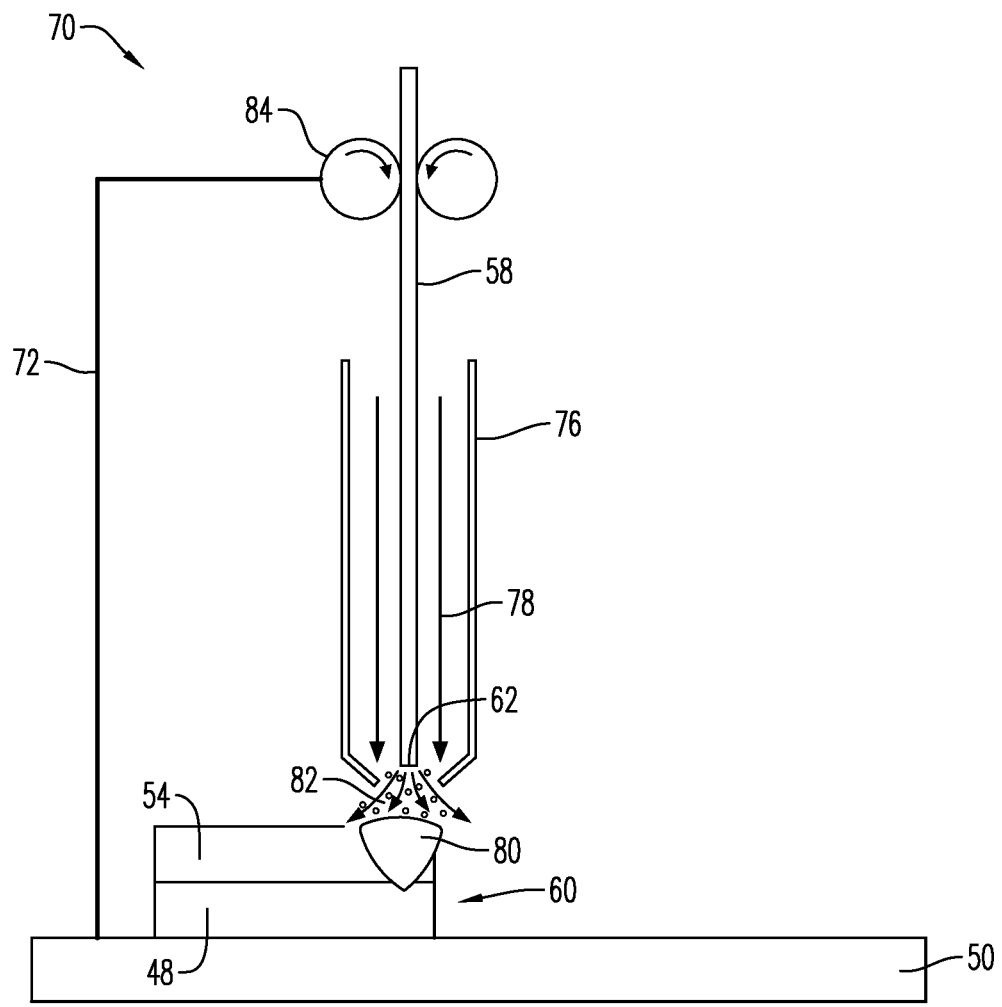
FIG. 21 is a schematic drawing of a wire arc apparatus according to an exemplary embodiment.

FIG. 21 shows an exemplary embodiment of a wire arc manufacturing apparatus 70. In apparatus 70, an electrical potential is applied to the wire 58 though the electrically conducting element 72 and the wire dispensing rollers 84. The electrical potential of the workpiece 60 may be significantly different from that of the wire 58; e.g., one may be charged and the other electrically grounded. The working tip 62 of the wire 58 may be held a distance from the workpiece 60 such that an electric arc 82 exists between the working tip 62 and the workpiece 60.

The plasma making up electric arc 82 may be hot enough to melt the working tip 62 of wire 58 as well as the portion of the workpiece 60 in contact with the plasma. A weld pool 80 may be formed on the workpiece 60 where the electric arc 82, i.e., plasma, touches the workpiece 60 and melted metal from the working tip 62 may be added to the weld pool 80. As a three-axis manipulator workpiece platform underlying the substrate 50 and the workpiece 60 is moved to the left, the weld pool 80 moves to the right and the portion of the workpiece 60 that had been exposed to the arc 82 is able to cool and, thus, become re-solidified alloy 54, which becomes part of the workpiece 60.

A nozzle 76 may be associated with a portion of the wire 58. The nozzle 76 may supply a shielding gas 78 to the welding area. The shielding gas 78 may be an inert or semi-inert gas used to reduce the concentration of oxygen and water vapor from the weld area; oxygen and/or water vapor may have detrimental effects upon arc welding results. Accordingly, apparatus 70 may alternatively be used under controlled atmospheric conditions including exclusion of oxygen and water vapor. In such a set-up, the nozzle 76 and the shielding gas 78 may not be necessary.

Continuous advancement of the wire 58 through the rollers 84 may maintain the weld pool 80 at a relatively constant size at a steady working state. The volumetric characteristics of what the re-solidified alloy 54 'adds' to the workpiece 60 with each layer of metal added may depend on the arc welding characteristics of the system, such as the difference in electrical potential between the wire 58 and the workpiece 60, the x-axis movement of the workpiece 60, the cooling parameters of the system, and the rate at which the wire 58 is consumed. Modifying these and other parameters may allow for varying thickness of the re-solidified alloy 54 layer on top of the prior deposit 48. The width, i.e., y-axis dimension, of the re-solidified alloy 54 may also be variable to at least some extent.

Material jetting is a manufacturing process that uses drop-on-demand technology. Nozzles may dispense droplets of a material, layer by layer. In an exemplary embodiment, UV light may cure and/or harden the droplets before the next layer is created. Alternatively, in an exemplary embodiment such as nanoparticle jetting, liquids may be infused with metal particles. As each layer of droplets is deposited onto the substrate, high temperatures in the build chamber may cause the liquid to evaporate, leaving the layer of metal behind.

A binder jetting process may employ powdered material and a binding agent. Nozzles may deposit droplets of a binder on a layer of powdered metal. Multiple layers result from the powder bed moving downward after each layer is created. It will be understood that the resulting structure may have a higher porosity than other manufacturing methods.

Ultrasonic welding may use metal sheets, ribbons or foils to build objects a single layer at a time. A variety of metals may be used in ultrasonic welding, including, but not limited to, titanium, stainless steel, copper, aluminum, tungsten, and tantalum. Metal layers may be conjoined through ultrasonic welding and compression via a rolling sonotrode, a device that generates the ultrasonic vibrations. Ultrasonic welding does not require melting and it may use less energy than other manufacturing processes. Machining and/or other finishing processing may be used to further refine the surface of the object and remove excess material.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A cladded article comprising:
a first metallic layer;
a clad layer, the clad layer comprising:
   a first clad layer region having a first clad layer thickness in a thickness direction of the clad layer; and
   a second clad layer region having a second clad layer thickness in the thickness direction of the clad layer;
wherein:
the second clad layer thickness is greater than the first clad layer thickness;
a first solid-state welding interface region positioned between the clad layer and the first metallic layer,
the second clad layer region comprises a projecting for forming a joint with another article;
the clad layer has a higher melting point than the first metallic layer;
the clad layer is formed of a material comprising tantalum or a tantalum alloy;
the second clad layer region comprises a plurality of foils; and
a foil of the plurality of foils is formed of a material comprising tantalum or a tantalum alloy.

2. The cladded article of claim 1, wherein the first solid-state welding interface region is a first explosion welding interface region.

3. The cladded article of claim 1, wherein the second clad layer region is one of a plurality of second clad layer regions.

4. The cladded article of claim 1, further comprising:
a second metallic layer; and
a second solid-state welding interface region bonding the second metallic layer to the first metallic layer on a side opposite the clad layer.

5. The cladded article of claim 4, wherein the second solid-state welding interface region is a second explosion welding interface region.

6. The cladded article of claim 1, wherein the clad layer comprises at least one of zirconium, niobium, palladium, platinum, ruthenium, rhodium, osmium, and iridium, or an alloy including one of zirconium, niobium, palladium, platinum, ruthenium, rhodium, osmium, or iridium.

7. The cladded article of claim 1, wherein a difference between the first clad layer thickness and the second clad layer thickness is greater than a thickness manufacturing tolerance of a clad layer having a uniform thickness equal to the first clad layer thickness.

8. The cladded article of claim 1, wherein the plurality of foils is solid-state welded to the clad layer.

9. A method of manufacturing a cladded article, the method comprising:
providing a first metallic layer comprising a first material and having a first metallic layer surface;
providing a clad layer comprising a second material and having a substantially uniform first clad layer thickness;
solid-state welding the clad layer to the first metallic layer surface; and
after solid-state welding the clad layer to the first metallic layer surface, creating a modified clad layer region by bonding material to an outer surface of the clad layer opposite the first metallic layer, wherein:
a second clad layer thickness in the modified clad layer region is larger than the first clad layer thickness,
the clad layer is formed of a material comprising tantalum or a tantalum alloy;
the second clad layer region comprises a plurality of foils; and
a foil of the plurality of foils is formed of a material comprising tantalum or a tantalum alloy.

10. The method of claim 9, wherein the clad layer comprises one of zirconium, niobium, palladium, platinum, ruthenium, rhodium, osmium, and iridium, or an alloy including one of zirconium, niobium, palladium, platinum, ruthenium, rhodium, osmium, and iridium.

11. The method of claim 9, wherein creating the modified clad layer region comprises creating a plurality of modified clad layer regions.

12. The method of claim 9, wherein a difference between the first clad layer thickness and the second clad layer thickness is greater than a predetermined thickness tolerance of a clad layer having a uniform thickness equal to the first clad layer thickness.

13. The method of claim 9, wherein creating the modified clad layer region comprises ultrasonically welding the plurality of foils to the clad layer.

14. The method of claim 9, wherein creating the modified clad layer region by bonding material to the surface of the clad layer comprises one of a group consisting of: a powder bed fusion process, a directed energy deposition process, a sheet lamination process, an ultrasonic welding process, a friction welding process, a friction stir welding process, a cold metal transfer process, a resistance welding process, a cold spray deposition process, and a warm spray deposition process.

15. A cladded article comprising:
a base layer;
a clad layer formed from a material comprising tantalum or a tantalum alloy;
a first solid-state welding interface region positioned between the clad layer and the base layer;
a clad layer projection bonded to an underlying portion of the clad layer; wherein
the clad layer projection comprises a plurality of layered foils ultrasonically welded to the clad layer;
a foil of the plurality of foils is formed of the material comprising tantalum or the tantalum alloy;
the clad layer projecting is configured to form a joint with another article; and
the clad layer has a higher melting point than the base layer.

16. The cladded article of claim 15, wherein the first solid-state welding interface region is a first explosion welding interface region.

* * * * *

UNITED STATES PATENT AND TRADEMARK OFFICE
CERTIFICATE OF CORRECTION

PATENT NO. : 11,897,228 B2
APPLICATION NO. : 17/480072
DATED : February 13, 2024
INVENTOR(S) : Karsten Guenther et al.

It is certified that error appears in the above-identified patent and that said Letters Patent is hereby corrected as shown below:

In the Claims

At Column 13, Claim 1, Line number 29, please delete "," and add --;--.

At Column 13, Claim 1, Line number 30, please delete the word "projecting" and add the word --projection--.

At Column 14, Claim 9, Line number 13, please delete "," and add --;--.

At Column 14, Claim 15, Line number 54, please add --:-- after the word wherein.

At Column 14, Claim 15, Line number 59, please delete the word "projecting" and add the word --projection--.

Signed and Sealed this
Sixteenth Day of April, 2024

Katherine Kelly Vidal
*Director of the United States Patent and Trademark Office*